United States Patent [19]
Tanaka et al.

[11] Patent Number: 4,739,547
[45] Date of Patent: Apr. 26, 1988

[54] NON-CROSSLINKED FOAM

[75] Inventors: Haruhiko Tanaka, Ohtake; Fukashi Kagawa, Yamaguchi; Kouji Nakashima, Hiroshima, all of Japan

[73] Assignee: Shell Oil Company, Houston, Tex.

[21] Appl. No.: 96,100

[22] Filed: Sep. 11, 1987

[30] Foreign Application Priority Data

Sep. 16, 1986 [JP] Japan ................................ 61-215844

[51] Int. Cl.$^4$ ............................................ B23P 11/02
[52] U.S. Cl. ........................................ 29/451; 29/412; 29/510; 29/428; 264/53; 264/54; 264/153; 264/DIG. 5; 264/DIG. 18; 521/81; 521/134

[58] Field of Search .................. 29/412, 428, 451, 510; 264/53, 54, 153; 521/81, 134

[56] References Cited

U.S. PATENT DOCUMENTS 3,032,826  5/1962  Brillinger ............................. 521/73
3,062,758  11/1962  Rainer et al. ........................ 521/73

Primary Examiner—Morton Foelak
Attorney, Agent, or Firm—Wendy K. B. Buskop

[57] ABSTRACT

A non-crosslinked foam of a composition comprising:
(A) 72 to 98% by weight of a 1-butene polymer; and
(B) 28 to 2% by weight of a propylene polymer, the percentages being based on the total weight of the 1-butene polymer and the propylene polymer.

1 Claim, No Drawings

NON-CROSSLINKED FOAM

BACKGROUND OF THE INVENTION

This invention relates to a non-crosslinked foam of a composition comprising a major proportion of a 1-butene polymer and a minor proportion of a propylene polymer. More specifically, it relates to a non-crosslinked foam of a composition comprising a 1-butene polymer and a propylene polymer having excellent heat resistance, sealability and heat creep resistance. It is contemplated that this foam could be used as a cap liner or for other applications, such as foam cushion packaging, other flexible packaging end uses, backing for wear surfaces, and other typical foam applications.

In recent years, cans for holding beverages have been superseded by bottles. Ampoules for holding pharmaceuticals are also desired to be replaced by bottles with screw caps because glass fragments are likely to get into the contents upon opening. The most important property required of caps used in such bottles is sealability, and to secure this property, foams of high-pressure low-density polyethylene have gained widespread use as cap liners of thermoplastic resins.

Containers holding pharmaceuticals and drinks are usually subjected to sterilization treatment at high temperatures, or retorting, after filling. The sterilizing temperature has recently tended to become higher for shortening the sterilizing time and increasing productivity, and nowadays, the sterilization treatment is carried out mainly at temperatures as high as at least 100° C.

High-pressure low-density polyethylene foams have low heat-resistant temperatures and cannot be sterilized at high temperatures of at least 100° C. and therefore cannot be used for such an application. On the other hand, polypropylene has excellent heat resistance but a uniform foam of polypropylene alone is very difficult to obtain.

Japanese Patent Publication No. 40,167/1981 discloses a foam prepared from a mixture of 90 to 30% by weight of polypropylene and 10 to 70% by weight of polybutene-1. The patent publication states that this foam has excellent heat resistance, high-temperature creep characteristics, mechanical strength and thermal insulating property and is suitable for use as a thermally insulating material for high-temperature structures. It also states that when the mixing proportions of polyproylene and polybutene-1 fall outside the above-specified ranges, a good foam cannot be obtained.

Japanese Laid-Open Patent Publication No. 129,025/1983 discloses a polyolefin foam prepared from a mixture of (a) 60 to 98% by weight of a propylene-/ethylene block copolymer having a melt index of 0.5 to 2.0 and an ethylene content of 5 to 15%, (b) 1 to 20% by weight of polybutene or a butene copolymer having a melt index of 2 to 10, and (c) 1 to 20% by weight of low-density polyethylene having a melt index of 2 to 10.

It is an object of this invention to provide a novel non-crosslinked foam of a composition comprising a 1-butene polymer and a propylene polymer. The term "non-crosslinked" has the same meaning as "non-vulcanized" which is the foam is produced without vulcanizing (crosslinking) agents or irradiations for vulcanizing (crosslinking). The term "foam" means foamed and expanded materials or sponge-like materials which have many small cells.

Another object of this invention is to provide a non-crosslinked foam suitable for use as a cap liner, such as a bottle closure, having excellent flexibility, sealability, heat resistance, heat creep resistance and hygienic property.

Further objects of this invention along with its advantages will become apparent from the following description.

SUMMARY OF THE INVENTION

The objects and advantages of this invention are achieved by a non-crosslinked foam of a composition comprising:

(A) 72 to 98% by weight of a 1-butene polymer, and (B) 28 to 2% by weight of a propylene polymer, the percentages being based on the total weight of the 1-butene polymer and the propylene polymer.

The 1-butene polymer (A) used in this invention includes, for example, a homopolymer of 1-butene and copolymers of at least 80 mole%, preferably at least 90 mole%, of polymerized units of 1-butene and not more than 20 mole%, preferably not more than 10 mole%, of polymerized units of an alpha-olefin having 2 to 20 carbon atoms other than 1-butene. The preferred olefins usable with the 1-butene are ethylene and propylene.

Examples of the other alpha-olefin having 2 to 20 carbon atoms include ethylene, propylene, 4-methyl-1-pentene, 1-hexene, 1-octene, 1-decene, 1-tetradecene, and 1-octadecene.

For easy production of a foam, the 1-butene polymer (A) (A) is preferably a crystalline polymer having a melt flow rate (MFR: ASTM D1238, E) of 0.05 to 50 g/10 min., preferably 0.1 to 20 g/10 min.

The melting point of the 1-butene polymer (A) is preferably at least 100° C., more preferably at least 120° C., in order to give a foam having good heat resistance.

The propylene polymer (B) used in this invention includes, for example, a homopolymer of propylene and copolymers composed of at least 70 mole%, preferably at least 90 mole%, of polymerized units of propylene and not more than 30 mole%, preferably not more than 10 mole%, of polymerized units of an alpha-olefin having 2 to 10 carbon atoms other than propylene. The preferred olefins usable with the present invention are butene and ethylene.

Examples of the other alpha-olefin having 2 to 10 carbon atoms other than propylene include ethylene, 1-butene, 4-methyl-1-pentene, 1-hexene, 1-octene, and 1-decene.

For easy production of a foam, the proylene polymer (B) is preferably a crystalline polymer having a melt flow rate (MFR: ASTM D1238, L) of 0.1 to 50 g/10 min., more preferably 0.5 to 20 g/10 min.

The non-crosslinked foam of this invention is composed of 72 to 98% by weight, preferably 75 to 95% by weight of the 1-butene polymer (A) and 28 to 2% by weight, preferably 25 to 5% by weight, of the propylene polymer (B) because with such a composition, the foam can be easily produced and has flexibility.

The non-crosslinked foam of this invention preferably has an expansion ratio of 1.5 to 8, especially 1.7 to 4. It has good flexibility and contains a small proportion of open cells. When it is applied as a cap liner, it has excellent sealability. Sealability, as used herein is regarded as the ability of the material to form a liquid-tight seal. Continued pressure reduction resistance value (airtightness value) is an Index of Sealability. If the value is higher (maximum value is 334 mmHg), sealability is better.

The expansion ratio denotes the ratio of the true density ($d_o$) of the unfoamed composition from which the foam is prepared to the apparent density (d) of the resulting foam, ($d_o/d$).

One preferred method of producing the non-crosslinked foam of this invention is a so-called extrusion foaming method which comprises extruding a composition comprising the 1-butene polymer (A), the propylene polymer (B), and a blowing agent in the molten or softened state from a die to release the extrudate into an atmosphere under normal atmospheric pressure from a high pressure state, thereby expanding the gas generated from the blowing agent in the composition. The blowing agent in such an extrusion foaming method is used generally in an amount of 0.2 to 5 parts by weight, preferably 0.4 to 2 parts by weight, per 100 parts by weight of the 1-butene polymer (A) and the propylene polymer (B) combined. If the amount of the blowing agent is less than 0.2 part by weight, the expansion ratio is low and a good foam may not be obtained. If it exceeds 5 parts by weight, the expansion ratio becomes too high, and the proportion of open cells tends to become larger. Hence, the sealability of the resulting form as a cap liner is reduced.

Specific examples of the blowing agent are evaporable blowing agents, for example fluorinated aliphatic hydrocarbons such as trichloromonofluoromethane and dicholorotetrafluorethane, and aliphatic hydrocarbons such as propane, methyl chloride, isobutane, pentane and hexane; and decomposable blowing agents such as sodium bicarbonate, ammonium carbonate, azodicarbonamide, barium azodicarboxylate, N,N'-dinitrosopentamethylenetetramine, 4,4-hydroxybis(benzenesulfonyl hydrazide), diphenylsulfone-3,3-disulfonyl hydrazide, p-toluenesulfonyl semicarbazide, trihydrazinotriazine and biurea. The evaporable blowing agents which completely volatilize leaving no residue and therefore are free from a hygenic problem, and azodicarbonamide and sodium bicarbonate as the decomposable blowing agent are preferred among them.

The composition used in this invention may contain additives normally used in polyolefins, such as heat stabilizers, slip agents and antistatic agents, in addition to the blowing agent. The amounts of these additives are such as not to impair the objects of the present invention.

Amount of additives to be blended within the scope of the present invention is recommended as follows:
heat stabilizers; 0.1~0.5 wt%
slip agents; 0.1~1 wt%
antistatic agents; 0.1~1 wt%

The non-crosslinked foam of this invention may be in various forms such as sheets, pipes, rods and tubes by properly changing the die of the extruder. A packing material such as a bottle closure may be produced using the non-crosslinked foam of this invention by, for example, punching out (cutting out) a cap liner of a predetermined shape from the foam in a sheet or rod shape, and as required, fitting it into a metallic outer shell of a crown cap, for example, or bonding it to the shell by an adhesive or otherwise.

Since the non-crosslinked foam of this invention has excellent flexibility, sealability, heat resistance, heat creep resistance and hygienic property, they can be used as a lining material for example of bottle closures such as various types of crown caps, pilfer-proof caps, and side seal caps. Such caps can be used for holding pharmaceuticals and beverages and can be subjected to sterilizing treatment at high temperatures. This foam can be modified to include other additives such as flame retardants.

The following Examples illustrate the present invention in greater detail. It should be understood, however, that the present invention is not limited in any way to these examples unless it departs from its spirit and scope.

EXAMPLE 1

Production of a non-crosslinked foamed sheet

One hundred parts by weight of a resin mixture (PB-I+PP-I) composed of 95% by weight of a 1-butene homopolymer (PB-I; MFR=0.4 g/10 min.; [$\eta$]: 2.6 dl/g; melting point: 125° C.) and 5% by weight of a propylene homopolymer (PP-I; MFR=0.5 g/10 min.) were mixed by a tumbler with 0.2 part by weight of azodicarbonamide (ADCA: Vinfor AC#3, a tradename for a product of Eiwa Chemical Industry Co., Ltd.) and 0.3 part by weight of sodium bicarbonate. The mixture was melt-kneaded in a single-screw extruder (screw diameter 40 mm; set temperature 120° C.) and extruded from a pipe forming die (set temperature 120° C.) to give a pipe-like foam. The pipe-like foam was cut open to give a sheet-like foam having a thickness of 2 mm. The resulting foam was closed-cellular and showed a good foamed condition. The term "closed cells" used herein means cells in which bubbles are surrounded by resin membranes in the foam and are not interconnected to one another within the foam. The term "open cells" means cells interconnected to one another within the foam. The respective percentages of these two types of cells are determined by the following equations after measuring the real volume ($\Delta V$) of a test specimen of a foam by an air substitution method.

$$\text{Closed cell percentage (Vol. \%)} = \frac{\Delta V - WS/dp}{Vs} \times 100$$

$$\text{Open cell percentage (Vol. \%)} = \frac{Vs - \Delta V}{Vs} \times 100$$

Vs: The apparent volume of the test specimen.
WS: The weight of the test specimen.
$\Delta V$: The real volume of the test specimen.
dp: The density of the plastic material constituting specimen.

It had an apparent density of 0.53 g/cm³ and a surface hardness, determined in accordance with JIS K-6301, of 82.

Evaluation of the properties of the foam as a cap liner:

A packing material, 27.5 mm in diameter, punched out from the resulting sheet-like foam was pushed and fitted into the inner surface of an aluminum cap having a diameter of 28 mm. Hot water at 80° C. was poured in an amount of 110 ml into glass bottle having a capacity of 120 ml and a mouth diameter of 25 mm, and immediately then, the glass bottle was sealed up with the resulting cap by using a capping machine (made by Shibasaki Seisakusho). The glass bottle was then left to stand in a retorting kettle at 121° C. for 30 minutes and taken out. It was laid down and allowed to cool at room temperature for 24 hours. Then, the bottle was checked for leakage of the water it held. Thereafter, the airtightness value and the opening torque value of the glass bottle were measured by the following methods.

Continued pressure reduction resistance value (airtightness value) (mmHg):

A pressure gauge was thrusted into the cap of the glass bottle, and the pressure of the inside of the bottle was measured.

If the bottle is completely sealed up, the pressure of the inside of the bottle ought to be 334 mmHg as a difference between the vapor pressure (355 mmHg) at 80° C. of water and the vapor pressure (21 mmHg) of water at room temperature (23° C.). The sealability of the glass bottle is better as the airtightness value is nearer to 334 mmHg. When there is leakage, the pressure is 0 mmHg.

Opening torque value (kg-cm):

The torque of the cap at the time of opening the bottle was measured by using a torque meter and used as a measure of the ease of bottle opening. To secure good sealability with a screw cap, it is generally sufficient to close it tightly. If, however, it is closed too tightly, it cannot be easily opened by a human power. The torque value which permits easy opening by aged people, women and children is considered to be not more than 10 kg-cm.

The results are shown in Table 1.

EXAMPLES 2-3

Example 1 was repeated except that a propylene-/ethylene random copolymer (PEC-I; MFR: 0.5 g/10 min.; ethylene content: 3 mole%) in the amounts indicated in Table 1 was used instead of PP-I used in Example 1. The results were good as shown in Table 1.

EXAMPLE 4

Example 1 was repeated except that PEC-I used in Example 2 was used in the amount indicated in Table 1 instead of PP-I used in Example 1. Probably because the cap liner composed of the resulting foam had too high a hardness, its adhesion to the bottle mouth was poor, and as shown in Table 1 leakage occurred. The airtightness value was as low as 20 mmHg. The opening torque value was also low.

EXAMPLE 5

Example 1 was repeated except that PEC-I used in Example 1 was used in the amount indicated in Table 1 instead of PP-I used in Example 1. The foamed state of the resulting foam was bad, and the expansion ratio was not so high. The foam was not closed-cellular, but open-cellular. The properties of the foam as a cap liner were also poor. The results are shown in Table 1.

TABLE 1

| EXAMPLE | POLYMERS | | | BLOWING AGENT | | PROPERTIES OF THE FOAM | | | PROPERTIES After heat-treatment | | |
|---|---|---|---|---|---|---|---|---|---|---|---|
| | PB-I (wt. %) | PP-I (wt. %) | PEC-I (wt. %) | ADCA (parts by weight) | Sodium bicarbonate (parts by weight) | Foamed condition and surface smoothness | Density (g/cm³) | Hardness (JIS K-6301) | Airtightness value (mmHg) | Opening torque (kg-cm) | Leakage |
| 1 | 95 | 5 | — | 0.2 | 0.3 | Good | 0.53 | 82 | 230 | 7 | No |
| 2 | 85 | — | 15 | 0.2 | 0.3 | Good | 0.48 | 80 | 220 | 8 | No |
| 3 | 75 | — | 25 | 0.2 | 0.3 | Good | 0.51 | 85 | 180 | 8 | No |
| 4 | 65 | — | 35 | 0.2 | 0.3 | Good | 0.58 | 90 | 20 | 3 | Yes |
| 5 | 50 | — | 50 | 0.2 | 0.3 | Poor | 0.67 | 95 | 0 | 2 | Yes |

What is claimed is:

1. A process for making a non-crosslinked foam comprising the steps of:
   blending 72 to 98% by weight of a 1-butene polymer selected from the group consisting of a homopolymer, and a copolymer composed of at least 80 mole % of polymerized units of 1-butene and not more than 20 mole % of an alpha-olefin having 2 to 20 carbon atoms other than 1-butene and mixtures thereof with 28 to 2% by weight of a propylene polymer selected from the group consisting of a homopolymer, and a copolymer composed of at least 70 mole % of polymerized units of propylene and not more than 30 mole % of polymerized units of an alpha-olefin having 2 to 10 carbon atoms other than propylene and mixtures thereof, and a blowing agent in a mixer;
   melt-kneading the mixture in an extruder;
   extruding the melt-kneaded mixture from a die therein forming a foam sheet;
   punching out cap inserts from the foam sheet;
   disposing the punched out inserts on the inner surface of a bottle cap forming a lined cap; and
   sealing a bottle with the lined cap.

* * * * *